Sept. 30, 1952  B. D. BROWN, JR  2,611,968
GAUGING INSTRUMENT
Filed Oct. 8, 1949

INVENTOR.
BASIL D. BROWN JR.
BY Hudson, Boughton,
Williams, David & Hoffmann
ATTORNEYS Patented Sept. 30, 1952

2,611,968

UNITED STATES PATENT OFFICE 2,611,968

GAUGING INSTRUMENT

Basil D. Brown, Jr., Springboro, Pa.

Application October 8, 1949, Serial No. 120,241

3 Claims. (Cl. 33—169)

This invention relates to a gauge and lay-out instrument primarily for use in the tool room of a manufacturing establishment wherein production tools, gigs, fixtures and other machine parts are produced, although the instrument is susceptible of advantageous use in other locations, such as laboratories, experimental departments, machine shops and other places.

An object of the invention is to provide an improved and novel gauging and lay-out instrument which can be readily adapted for and employed in a variety of gauging and lay-out operations which may include the following illustrated operations: Squareness and radii inspection; vertical and horizontal measurements, squaring operations; height and surface gauging; comparing operations; bore depth and plane surface inspection set-ups; checking of location of bores and of diameters for concentricity; course or close lay-out and inspection and many other purposes.

Another object is to provide a gauging and lay-out instrument which can be designated as a "universal" gauging and lay-out instrument in that the instrument is capable of being adapted to perform the wide variety of operations referred to and thus eliminates the necessity of the user having available a number of different types of gauging and lay-out instruments.

Another object is to provide an improved and novel gauging and lay-out instrument which is so designed that a plurality of different gauging or lay-out tools can be mounted on the instrument and used as desired for various operations without interfering with each other and capable of being readily and selectively brought from an inoperative position into an operative position.

Further and additional objects and advantages not hereinbefore referred to will become apparent hereinafter during the detailed description of an embodiment of the invention which is to follow.

The invention contemplates a gauging and lay-out instrument which comprises an accurately formed base positionable on a surface plate and from which perpendicularly extends an accurately formed column which adjustably mounts a slide having an indexible and removable tool holder revolvable on an axis perpendicular to the column and capable of mounting a plurality of different gauging or lay-out tools.

The invention further contemplates the provision of cooperating means on the slide and the tool holder for positively locating and locking the latter in proper indexed positions.

The column of the instrument will be provided with a proper measuring scale while the slide will carry a vernier cooperating with the scale to accurately determine the distance from the bottom of the base, i. e., the surface of the surface plate to the gauging or lay-out tool carried by the holder and currently being used.

The column is also provided with a splined groove while the slide has an adjustable key cooperating with said groove to maintain the proper relationship between the scale and the vernier and to prevent rotation of the slide on the column when the slide is not clamped to the column and is movable longitudinally thereof. The column also slidably mounts a slide positioner which can be clamped to the column and which is connected to the slide by a micrometer screw and nut and provides for fine adjustment of the slide on the column.

An embodiment of the invention is illustrated in the accompanying drawing wherein Fig. 1 is a perspective view of a gauging and lay-out instrument embodying the invention.

Figures 1, 2, 3, 4, 5:
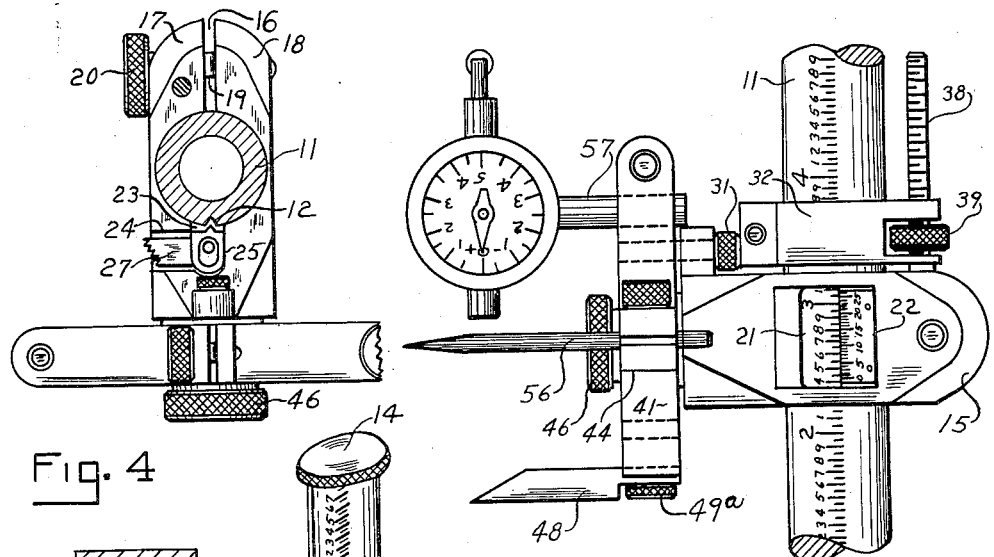
Fig. 2 is a fragmentary elevational view of the instrument on a larger scale than Fig. 1 and showing a portion of the column, the slide, the slide positioner and the indexible tool holder mounted on the slide with a plurality of different gauging and lay-out tools mounted in the tool station arms of the holder.
Fig. 3 is a view similar to Fig. 2 but with portions of the slide and tool holder shown in section and with certain of the tools shown in Fig. 2 omitted, while the slide is shown in a different relative position with respect to the slide positioner than in Fig. 2.
Fig. 4 is a plan and sectional view taken substantially on line 4—4 of Fig. 3 looking in the direction of the arrows.
Fig. 5 is a detail sectional view through the slide and adjustable key carried thereby.

The base of the instrument is indicated at 10 and is shown, in this instance, as of rectangular configuration and preferably is formed of cast or machined steel. The underside of the base is accurately machined to correspond to the top surface of a surface plate of the type generally available for use with instruments of this type.

In order to provide proper weight for the base it may be hollowed from its bottom surface, which also has the advantage of reducing the area of the bottom surface that contacts the surface plate and thus avoiding probable errors.

All of the sides of the base 10 are machined to be right angle surfaces with respect to adjacent sides and also to be parallel to master block gauges which may be placed against the sides of the base.

The column is indicated at 11 and may be formed of tool steel tubing or rod suitably hardened, machined and ground throughout its length. The column 11 shown herein is illustrated as of tubing and its outside circumference is accurately machined for concentricity and parallelism the full length of the column.

The column 11 is mounted on the base 10 so as to be accurately perpendicular thereto. The interconnection between the column 11 and the base 10 may take various forms, one illustrative form being to provide the base 10 with a suitable opening and on its hollowed underside with a boss into which the lower end of the column has an accurate pressed fit.

The column 11 is provided throughout its length with a spline groove 12 and substantially 90° from the groove with a longitudinally extending scale 13, herein illustrated as calibrated in inches and fractions thereof, it being understood that it might be calibrated in metric or other forms of measurements.

The scale 13 is so arranged and calibrated that when the slide, later to be referred to, is in its lowermost position with the zero mark of the slide carried vernier at the zero mark of the scale, then the underside of the feeler gauge or tool shown in Fig. 1 will be level with the bottom of the base 10 and contact the upper surface of the usual surface plate.

The column 11, as stated, is preferably formed of tubing so it can be mounted between centers (the end openings of the column being beveled for this purpose) and used as a test rod to test the alignment of the centers.

The open upper end of the column 11 is internally threaded and is normally closed by a screw cap 14 which also functions as a stop for the upward movement of the slide positioner and slide.

The slide comprises a body 15 provided with a bore through which the column extends so that the slide can have accurate sliding movement on the column. The body 15 is provided at its rear end with a slot 16 extending radially with respect to the bore through the body and providing spring clamp arms 17 and 18 for clamping the slide to the column. The arms 17 and 18 are provided with aligned clearance and threaded openings therethrough, respectively. A clamping screw 19 is rotatably mounted in the openings and is provided with a knurled operating head 20.

When the screw 19 is backed off the slide 15 is free to slide on the column 11 but preferably the screw will be loosened only sufficiently to allow the slide to move on the column with a frictional drag. When the screw 19 is tightened the slide is clamped to the column against vertical sliding movement.

The slide or body 15 is provided on one side with a window 21 and has attached to it and within the window a vernier 22 which cooperates with the scale 13 and can be observed through the window, a magnifying glass being placed over the window if desired.

The body 15 in its upper side and adjacent its forward end is provided with a recess 23 from which laterally extends a slot 24. The recess 23 forms a guideway for a sliding or adjustable key 25 which has a key projection engageable in the spline groove 12. The key 25 is provided in its upper side with a recess in which is located the head of a locking screw 26, the reduced threaded shank of which extends through a slot in the key and into a threaded opening in the body 15 (see Fig. 5), wherefore when the screw is loosened the key can be moved to position the key projection thereof in the spline groove 12 or to remove said projection from said groove. When the screw is tightened the key is clamped in desired position between the screw head and the bottom of the recess 23 in the slide 15. The key is provided with a laterally extending actuating portion 27 which projects outwardly of the lateral slot 24 in the body 15. It will be seen that when the key projection of the key 25 is engaged in the spline groove 12 and the screw 26 is screwed to key clamping position, then the slide is locked against rotation relative to the column and the vernier 22 is properly located with respect to the scale. Of course when the screw 26 is loosened and the key 25 is moved to withdraw the projection from the spline groove then the slide can be rotated relative to the column but in such case the vernier will be displaced with respect to the scale.

The front end of the carriage or body 15 centrally of the body is provided with a tapered bearing projection or nose 28 which has a centrally located threaded bore 29. The slide or body 15 on its upper side and above the nose 28 is provided with an upwardly extending lug 30 having therein an opening in which an index pin 31 is slidably mounted. The purpose of the nose 28 and index pin 31 will later be explained.

The slide positioner is indicated at 32 and comprises a clamp member having an opening therethrough so that the member can slide on the column 11. The member 32 is provided with a slot 33 extending radially of the opening just mentioned and furnishing the slide positioner with separated arms 34 and 35 provided with suitable aligned clearance and threaded openings for a clamping screw 36 which can be tightened to draw the arms together and clamp the slide positioner in a desired location on the column or can be loosened to allow separation of said arms for movement of the slide positioner longitudinally or rotationally of the column.

The slide positioner 32 also has a slot 37 at right angles to the opening through the positioner and forming a forked portion, the arms of which are provided with aligned clearance openings to receive a micrometer screw 38. An adjusting nut 39 is mounted on the micrometer screw 38 intermediate the arms of the forked portion of the positioner. The micrometer screw 38 extends vertically and parallel to the column 11 and is rigidly connected at its lower end to the slide 15.

It will be evident that when the positioner 32 is clamped to the column 11 rotation of the nut 39 will effect a micrometer adjustment of the slide 15 upwardly or downwardly of the column relative to the positioner, wherefore the slide can be accurately located by means of the vernier and scale at a predetermined distance above the surface plate on which the base 10 is resting.

The tool holder comprises a central hub portion 40 from which radially project a plurality of tool arms, there being shown in this instance for purposes of illustration four such arms, namely, 41, 42, 43 and 44, equally displaced around the hub with adjacent arms at right angles to each other.

The hub 40 is provided with a tapered bore fitting the tapered bearing nose 28 of the slide so as to provide clearance between the rear side of the tool holder and the front end of the slide. The tool holder when mounted on the nose 28 can be rotated or indexed with respect to the slide and can be clamped in indexed position by means of a clamping screw 45 screwed into the threaded opening 29 in the nose and provided with a shouldered knurled operating head 46 accessible from the front side of the tool holder.

It will be seen that when the screw 45 is tightened the shouldered head 46 will act on the front face of the tool holder to force the tapered opening in the tool holder tightly onto the tapered nose 28 thus accurately locating the tool holder with respect to the slide.

Each arm of the tool holder is provided with an opening 47 adapted to align with the locking pin 31 carried by the lug 30 of the slide, wherefore the tool holder can be positively and accurately located in its different indexed positions by engagement of the pin 31 in a particular opening 47, after which the tool holder may be locked in its indexed position by the screw 45. The index pin 31 while preferably carried by the slide, as shown, may be inserted through the openings 47 and into the opening in the lug 30 from the front of the tool holder if desired. However, the illustrated arrangement has the advantage that the knurled head of the index pin 31 will engage the column 11 to prevent the pin from being accidentally completely withdrawn from the opening in the lug 30.

The arm 41 of the tool holder is shown as provided at its outer end with a recess to receive the attaching shank of a feeler gauge 48 which gauge can be clamped to the arm by means of a suitable clamping screw extending through an opening in the shank of the feeler gauge and into a threaded opening in the arm 41, the head 49a of such screw being shown in the drawing.

It will be noted that when the feeler gauge or scribing tool 48 is mounted as shown in the drawings the head of the screw 49a is countersunk with respect to the undersurface of the feeler gauge. Of course when the tool holder is indexed 180° the feeler gauge 48 can be mounted on the arm 41 in the same way.

The arms 42, 43 and 44 of the tool holder are provided adjacent their outer ends, respectively, with openings 49, 50 and 51 of differing diameters and also with longitudinal slots 52, 53 and 54 extending, respectively, from the openings 49, 50 and 51 longitudinally of the arms to the outer ends thereof.

Each of the arms 42, 43 and 44 is provided adjacent its outer end with aligned clearance and threaded openings to receive clamping screws, the knurled heads of which are indicated at 55, it being understood that when these screws are tightened the slotted ends of the arms will be drawn together to clamp a suitable tool in the openings 49, 50 and 51 as the case may be.

A scriber tool 56 is shown in Fig. 2 clamped in the opening 51 of the arm 44 of the tool holder while a dial feeler gauge 57 is illustrated as having its attaching shank clamped in the opening 50 of the arm 43.

It will be understood that an additional gauge or lay-out tool can be similarly clamped in the opening 49 of the arm 42. The various gauging or lay-out tools mounted in the arms of the tool holders can be so arranged that they may be separately used upon proper indexing of the tool holder without interference with each other, wherefore the instrument can be employed for a variety of different gauging and lay-out operations, simply by indexing the tool holder.

By way of example it will be observed that the feeler gauge 48 can be employed to check the height of a surface above the surface plate while the scriber 56 can be used for scribing lines for lay-out purposes. Also it will be understood that the dial feeler gauge 57 can be employed to check parallelism with respect to the surface plate. It will further be understood that by mounting a suitable articulated dial feeler gauge in one of the arms of the tool holder the concentricity of a bore or of an external cylindrical surface can be checked by the instrument.

The clamping screw 45 may be provided beyond the knurled operating head 46 with an extended bar 58 (see Fig. 3) upon which various suitable gauges or tools can be mounted for still additional gauging or lay-out operations.

Although a preferred embodiment of the invention has been illustrated and described herein it will be understood that the invention is susceptible of various modifications and adaptations within the scope of the appended claims.

Having thus described my invention, I claim:

1. A gauging and lay-out instrument comprising a base having an undersurface adapted to cooperate with a surface plate and side surfaces adapted to cooperate with gauge blocks, a column carried by said base and extending perpendicularly of said undersurface, said column being provided with a scale and a splined groove both extending longitudinally thereof, a slide slidable longitudinally of said column and provided with means for clamping it in adjusted position thereon and with a window normally overlying said scale and with a vernier located in said window and cooperating with said scale, said slide being provided with a recess, a key movably mounted in said recess and cooperating with said groove, said slide carrying a locking screw extending through a slot in said key and provided with a clamping head engageable with said key whereby said key may be moved to either groove engaging or disengaging position and locked in either position, said slide having a bearing nose extending in a direction transverse and perpendicular to said column, a tool holder having a hub portion indexibly mounted on said nose and a plurality of angularly displaced arms extending therefrom in a plane parallel to said column and provided with means for mounting thereon gauging or lay-out tools, and means carried by said nose and cooperating with said holder for locking said holder in various indexed positions.

2. A gauging and lay-out instrument as defined in claim 1 and wherein said means for locating said tool holder in its various indexed positions comprises a lug on said slide and parallel to said column and provided with an opening that is perpendicular to said groove when said key is aligned with said groove, said arms of said tool holder each being provided with an opening adapted to be selectively aligned with said lug opening, and a pin carried by said lug opening and insertable into the aligned arm opening and provided with an actuating head located intermediate said lug and said column.

3. A gauging and lay-out instrument as defined in claim 2 and wherein said bearing nose of said slide is externally tapered and is provided with a central threaded bore while said hub portion of said tool holder is provided with a tapered bore interfitting said nose, and the means for locking said holder in various indexed positions is a threaded member screwing into said threaded bore in the nose and provided with a shouldered portion cooperating with the outer side of the hub portion of said tool holder.

BASIL D. BROWN, Jr.

REFERENCES CITED

The following references are of record in the file of this patent:

UNITED STATES PATENTS

| Number | Name | Date |
|---|---|---|
| 391,488 | Smith | Oct. 23, 1888 |
| 476,806 | Mauser | June 14, 1892 |
| 1,179,551 | Muller | Apr. 18, 1916 |
| 1,824,153 | Jacobs | Sept. 22, 1931 |
| 2,345,312 | Sorenson | Mar. 28, 1944 |

FOREIGN PATENTS

| Number | Country | Date |
|---|---|---|
| 2,496 | Great Britain | May 5, 1894 |
| 369,503 | Germany | Feb. 15, 1921 |
| 345,637 | Germany | Dec. 15, 1921 |
| 561,716 | France | Oct. 26, 1923 |
| 570,895 | Germany | Feb. 21, 1933 |
| 885,587 | France | May 31, 1943 |

OTHER REFERENCES

Publication: American Machinist, Sept. 13, 1945, page 133.